US007689293B2

(12) United States Patent
Weik, III et al.

(10) Patent No.: US 7,689,293 B2
(45) Date of Patent: Mar. 30, 2010

(54) ACTIVE OXYGEN MANAGEMENT, FIRE ENCIRCLEMENT, AND OPERATIONAL VERIFICATION SYSTEM

(75) Inventors: Martin Herman Weik, III, Arlington, VA (US); Paul Michael Brown, Washington, DC (US)

(73) Assignee: Smart Door Systems, Inc., Arlington, VA (US)

( * ) Notice: Subject to any disclaimer, the term of this patent is extended or adjusted under 35 U.S.C. 154(b) by 1356 days.

(21) Appl. No.: 10/971,013

(22) Filed: Oct. 25, 2004

(65) Prior Publication Data

US 2006/0101721 A1 May 18, 2006

(51) Int. Cl.
*G06F 19/00* (2006.01)

(52) U.S. Cl. ......................... 700/17; 700/275; 340/5.28

(58) Field of Classification Search .................. 700/17, 700/275; 340/552, 310.11, 5.28, 5.5, 5.7; 160/7, 9, 1–2, 188, 133; 707/200; 292/201, 292/92, 93; 49/7; 235/382, 375, 382.5
See application file for complete search history.

(56) References Cited

U.S. PATENT DOCUMENTS 4,147,197 A 4/1979 Bailey et al.
5,070,442 A * 12/1991 Syron-Townson et al. ..... 700/17
5,453,736 A * 9/1995 Noren ........................ 340/5.6
5,979,754 A * 11/1999 Martin et al. ............... 235/382
6,079,162 A * 6/2000 Hein ............................... 52/1
6,484,784 B1 11/2002 Weik, III et al.
6,715,586 B1 * 4/2004 Shubin ....................... 187/316
2003/0097188 A1 * 5/2003 O'Mahoney et al. .......... 700/17
2003/0193393 A1 * 10/2003 Ford ........................... 340/506

* cited by examiner

*Primary Examiner*—Kidest Bahta
(74) *Attorney, Agent, or Firm*—Birch, Stewart, Kolasch & LLP

(57) ABSTRACT

An active oxygen management, fire encirclement, and operational verification system. The system includes multiple doors and enclosing interior spaces, a programmable door controller, and at least one sensor associated with each of the doors. The sensors monitor predetermined conditions associated with the associated door. Each door controller is interconnected with each other door controller and contains instructions for communicating messages and commands to other specific door controllers if one or more of the predetermined conditions is determined to be an abnormal condition. If the abnormal condition is sensed by a sensor associated with one door, the programmable door controller associated with that door executes a predetermined set of instructions issuing a command to the programmable door controller associated with at least a second door. This command from the first door controller causes the second programmable door controller to execute a predetermined instruction set affecting the second door.

24 Claims, 8 Drawing Sheets

300

| | DOORS / VENTS IN RING |
|---|---|
| RING A | 10, 10A, 10G, 10L, V |
| RING B | 10G, 10F, 10D, 10E, V1, 10H |
| RING C | ETC |
| RING Re | 10, 10A, 10L, V, 10F, 10D, 10E, V1, 10H |

301

| |
|---|
| IF RING A IMPLEMENTS, SEND REPORT |
| IF RING A FAILS, EXECUTE Re, SEND REPORT |
| IF RING Re FAILS, ETC |
| |

FIG.5

ACTIVE OXYGEN MANAGEMENT, FIRE ENCIRCLEMENT, AND OPERATIONAL VERIFICATION SYSTEM

BACKGROUND OF THE INVENTION

1. Field of the Invention

The present invention relates to an active oxygen management, fire encirclement, and operational verification system. More particularly, the present invention relates to an integrated system having both centralized, distributed and individual intelligence for active oxygen management, testing, monitoring, and reporting on the operating condition of multiple fire doors which are individual or networked together and distributed across multiple locations in a building or complex. Further, the invention provides for automatic operational testing, monitoring, and reporting on a condition of each of the fire doors in the system.

2. Description of the Background Art

In commercial, industrial, residential, public, and multi-family residential buildings, fire doors are widely used to separate different parts of the building from one another to protect those building sections and their occupants from damage and loss of life caused by the spread of fire, smoke, heat, and super heated or toxic gases, to adjacent areas of the building. These fire doors are generally of four different types: swinging, overhead rolling, sliding, and bi-folding, or a combination such as rolling and swinging acting in unison and designed for both human and vehicular traffic. Smaller doors such as counter shutters, duct dampers and drop panels allow material to pass through firewalls or provide an avenue for ventilation. All these fire doors typically close off building spaces or sections and protect against the spread of fire for rated periods from (20) minutes to (4) hours. The closing of these doors must occur in the absence of building fed power systems, since electrical power may be lost due the fire itself or contributing factors, such as an earthquake, or an explosion, etc.

These fire doors of the background art are activated to close by several types of inputs.

1. A local melt-away fusible link can be provided. When excessive heat is present, the link will melt and release a holding mechanism that then allows the door to close.

2. Local Smoke detectors (with or without battery back up power) can be provided that send an electronic signal to the fire door that initiates the automatic closing cycle. The activation of a detector and door controller may trigger additional doors in the local network of doors to close as well, such as all the doors on a firewall or opposite doors on a firewall.

3. A hard wired non-local building smoke and fire detection system can be provided. The non-local system can actuate the fire doors by ceasing to transmit a constant electrical signal that is normally provided to the door on a 24/7 basis. Whenever fire and/or smoke is detected in the building, the non-local system will remove the signal and cause the fire doors to close. Also, a loss of electrical power will cause the doors to close.

4. Hard-wired central computer driven smoke, fire and security systems that send a signal (or the removal of that signal) to the fire doors in the building to actuate their closing cycle are employed in more sophisticated buildings (and ships).

Existing fire door products are based on several basic closing methods to effect closed-door fire protection (also smoke, heat and super heated or toxic gas protection). They are:

1. Swing doors: These openings are normally closed by spring driven arms and rotating spring force closures that are governed and speed controlled by hydraulic, closed end control mechanisms. These spring driven closures force the door closed when the power is removed from an electromagnetic hold open device powered by the building electrical system and actuated by one of the four methods listed above.

2. Rolling overhead doors: These openings are closed by gravity-driven mechanisms (sometimes with spring assist) or battery back-up powered electrical motors activated by one of the four methods listed above. The current one (1) million (USA) gravity driven fire doors that require resetting by a trained technician have a 30% failure rate to close when signaled, as estimated by the American Rolling Door Institute.

3. Sliding, side coiling and accordion Fire Doors: These openings are closed by gravity with weights or with spring assist systems, and are speed controlled by mechanical governing systems.

4. At present none of the fire doors described above operate based on a built in electronic logic controller. At present, none of these fire doors have the intrinsic ability to communicate with one another using an electronic logic control system. At present, none of these fire doors have the intrinsic ability to communicate with one another over wired, wireless, and Internet connections built into their control design. At present, none of these fire doors above have the intrinsic ability to close in concert with one another to isolate specific building areas to prevent the spread of fire beyond a specific programmable area determined by a high cost, a high end building fire isolation plan, or a "one drop-all drop" hard wired drop control system.

A. At present none of the existing fire door on the market have the intrinsic ability to prevent the spread of smoke by closing in concert with one another to isolate specific, programmable areas of the building to prevent building damage, injury and loss of life by following a built in, programmable smoke isolation plan.

B. At present, none of the fire doors in existence have an intrinsic logic-driven electronic system for preventing the spread of fire, smoke, toxic gas, biological contaminants, etc. by the use of a specific, programmable locally programmable oxygen management system.

C. At present, none of the fire doors in existence have an intrinsic logic-driven electronic system to alert firemen as to the integrity of a closed oxygen managed fire area.

At present, none of the fire doors in existence have an intrinsic logic-driven electronic system to alert firemen that they are entering or are about to enter a closed oxygen managed area.

D. Finally, at present, no fire doors exist in the market that have a integrated, built-in system or controller for the automatic testing and verification of an operational capability for a fire, smoke, gas, oxygen management control program.

In summary,

Existing fire doors

1 Do not report their UL test results.
2. Do not display their last test date.
3. Do not display their operational status.
4. Do not calculate their closing speed and generate UL PASS and FAIL data.
5. Do not report pass/fail and test results to any central authority or interested party.
6. Do not report independently and directly to insurance carrier.
7. Do not alert firemen that they are entering Oxygen Management Area (O2 MAN AREA) and potential back-draft hazard.

8. Do not network with "distributed intelligence" so that the loss of one node does not compromise the entire system.
9. Are not run by networked programmable door controller (PLC's)
10. Are not run by networked programmable door controllers communicating with a central controller for displaying operations status, test results, local fire conditions and other abnormal conditions of the networked doors.
11. Cannot display generate or transmit message that fire is encircled or not and if not, which unit failed to close and provide floor area and location information.
12. Cannot adapt to failure to close on one or more nodes and shift O2 Management Area to a wider circle and display corresponding messages.
13. Cannot perform system operation tests simulating heat and/or smoke detection on any node, generate test results (close verifications), pinpoint deficiencies and manage maintenance.

SUMMARY OF THE INVENTION

The present invention has as a primary object to improve on the mechanisms of the background art and to solve the drawbacks associated with the mechanisms of the background art.

The system envisioned by the inventors includes a centralized programmable controller as well as programmable door controllers located in conjunction with each door of the multiple door system. Each of the door controllers is programmable and includes the logic to decide appropriate actions to take upon receiving an abnormal condition signal from one or more of the sensors associated with the door. The door controller also communicates the appropriate messages to its display screen, to other door controllers, and to the central controller, alerting these of the abnormal condition, and triggering appropriate actions at these other site. For example, the system envisioned by the inventors provides the capability (using strategically-located detectors) to isolate building areas from smoke based on a multi-variable detection/location program. Once again, these capabilities are built into the door controllers themselves. In other words, each door with a door controller need not depend on a central computer or central controller in order to initiate action when an abnormal condition occurs.

Further, the programmable door controller becomes an integral element of the oxygen management system for the building. Here a door controller at one door that has sensed an abnormal condition, such as smoke, or a temperature above a predetermined level, would prevent the spread of the fire to specific areas of the building by issuing "close door" messages to itself and to selected other doors to prevent the spread of fire to specific areas of the building by closing off areas of the buildings' door openings, mechanical system, air feeds, and exterior and interior air filtration vents. The door controller also interacts with the positive pressure fire protection plan of the buildings architecture by closing doors, vents, louvers, and other oxygen sources within the building. This feature will work with the other fire door controllers in the building so that the fire door controllers associated with each of the fire doors themselves can provide closing barriers preventing the actual flame spread, and so that the system can provide an outer perimeter (or ring), thus acting as an effective oxygen management system for limiting the oxygen that feeds the growth of the combustion.

And further, once the controllers have established a ring around a fire and verified its integrity, the perimeter will be so designated on the display screen of each perimeter unit to alert firemen that they are entering (or are about to enter) a controlled O2 management zone).

Still further, intrinsic to the door controllers of the present invention, is the ability to do regular testing of each component, and to transfer the logged results of the testing program to one or more of the door controllers or to a central controller for building management to view, and/or directly to the applicable insurance carrier by wired or wireless connections over the Internet. The system of the present invention can provide a positive means for limiting the spread of fire, smoke, superheated and toxic gases, and oxygen suppression. As such, the system provides the opportunity to have a significant mathematical effect on the actual numbers for the spread of building damage, injury, and loss of life related to these threats. A significant change downward in the insurance carrier's payout for damage claims can only have one effect: lower insurance premium costs for the building owner protected by the system of the present invention. The testing and monitoring of whether or not a specific door closes, and how fast it closes, the information logging, self-testing, data storage, reporting, (i.e. last test date and result), and other system test functions, all accrue to individual door controllers, as well as the networked doors.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein:

FIG. 5 shows representative data tables stored in the database of each programmable door controllers;

DETAILED DESCRIPTION OF THE INVENTION

Figure 1:
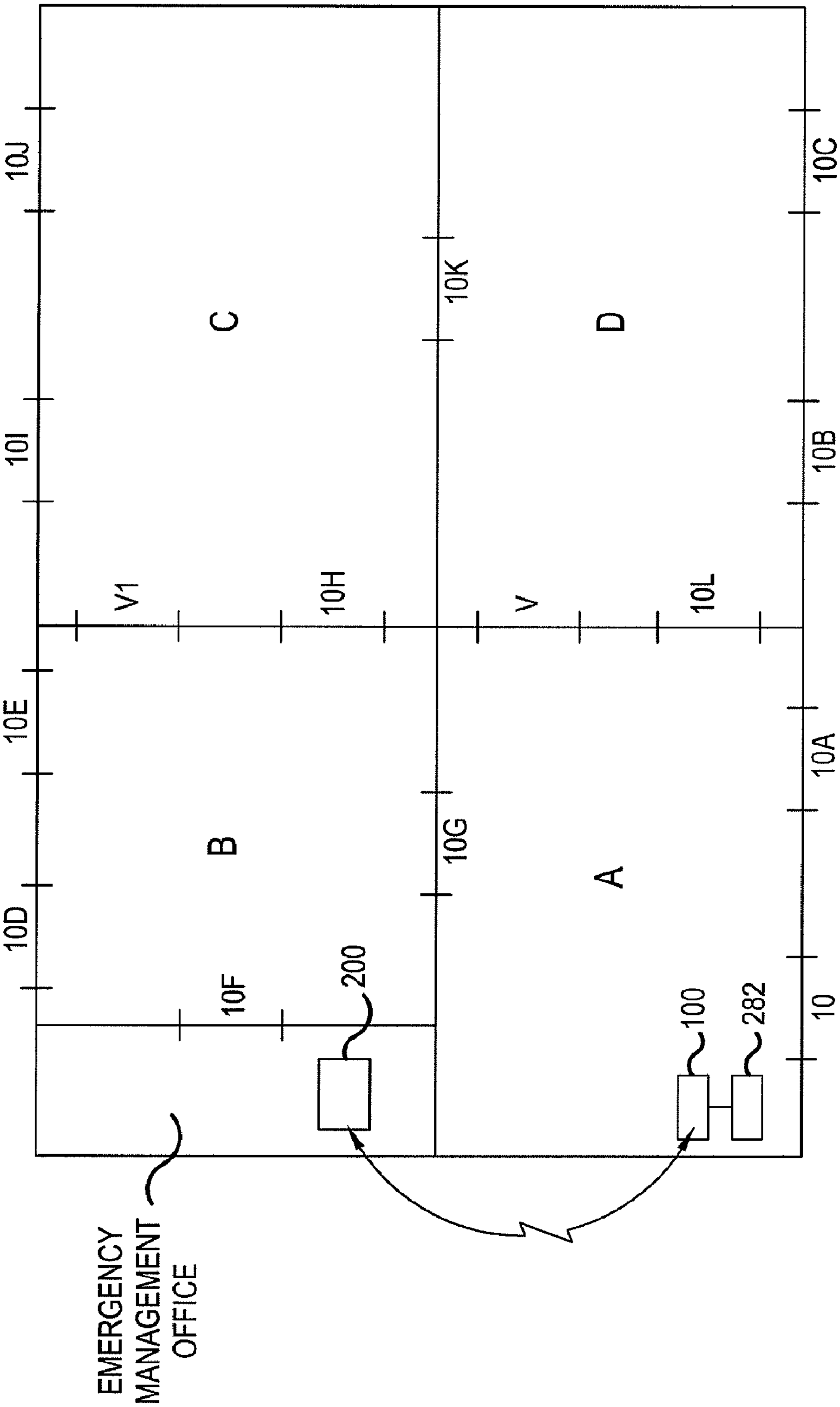
FIG. 1 is an overall diagram showing multiple fire doors each having a door controller, connected to a central site and to each other via a network.

FIG. 1 is an overall diagram showing multiple fire doors each having a door controller, connected to a central site and to each other via a network.

Shown is a representative building with areas A, B, C, and D. Also shown are doors 10, 10A, 10B, 10C, 10D, 10E, 10F, 10G, 10H, 10J, 10K, and 10L, vents V and V1, central controller 200 in the emergency management office.

Figure 2:
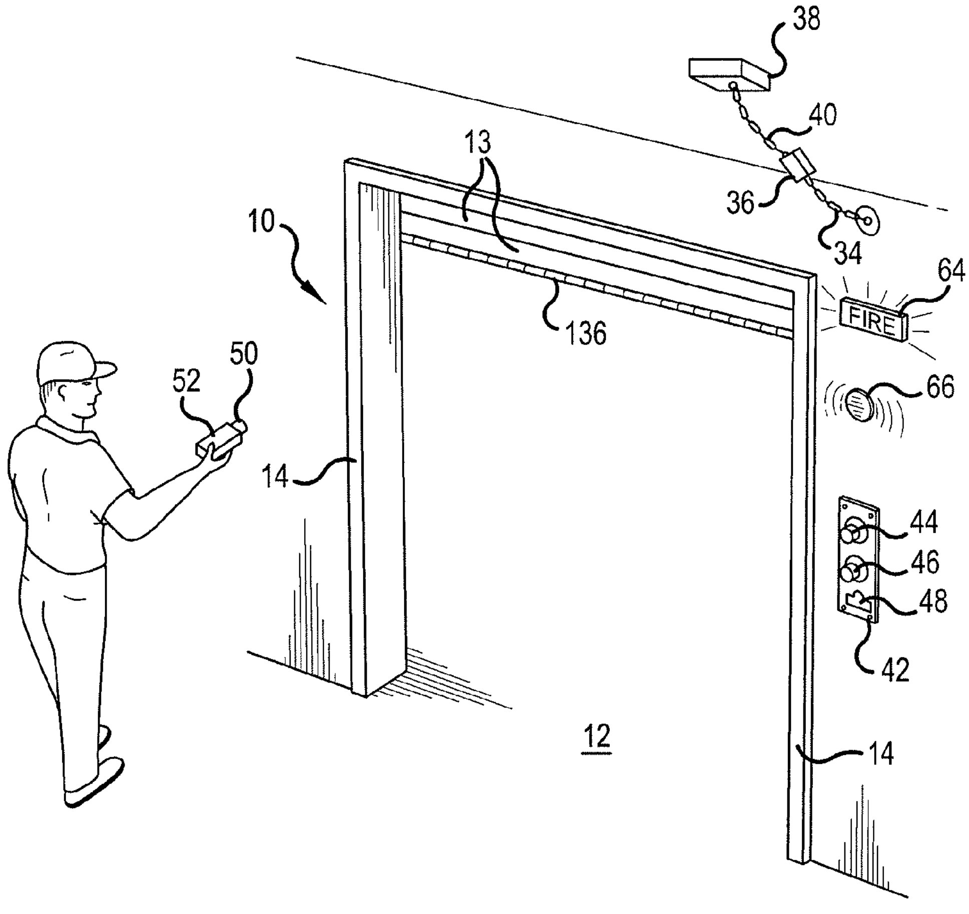
FIG. 2 is a diagram of one side of a rolling overhead fire door of the present invention showing the door controller and sensors.
Figure 3:
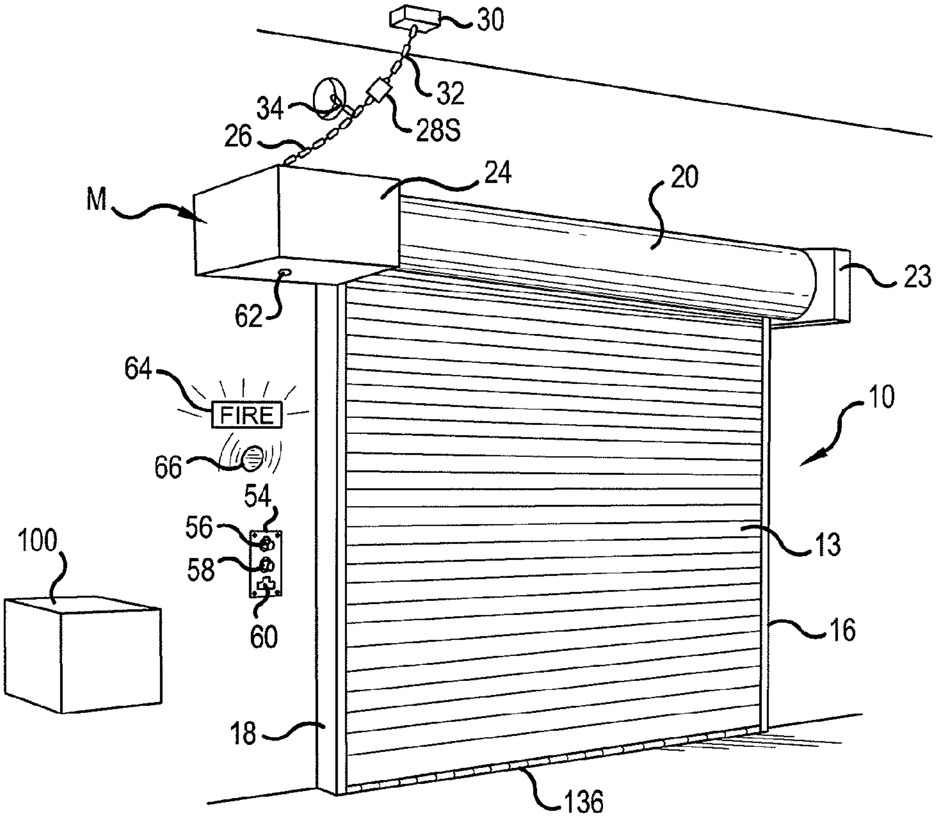
FIG. 3 is a perspective view of the other side of the rolling overhead fire door of FIG. 2.

FIG. 2 is a diagram of one side of door 10 shown in FIG. 1 (in this case a rolling overhead fire). FIG. 3 is a perspective view of the other side of the fire door 10 of FIGS. 1 and 2.

FIG. 2 illustrates the fire door 10 in an open, first position, whereas FIG. 3 illustrates the fire door 10 in a closed, second position. As shown in FIG. 3, a programmable door controller 100 is located adjacent to door 10. As described below, the programmable door controller 100 is connected to various sensors and detector associated with door 10, and is interconnected to the central controller in the central operations center and to door controllers associated with each of the other fire doors in the building.

Next, the features of the fire door 10 which are commonly employed in the background art will be briefly described. The fire door 10 is provided to selectively block a throughway 12 defined inside a frame 14. Although the throughway 12 is illustrated, as being at grade level, so that a person or vehicle could pass therethrough, the throughway 12 could also be an external window, countertop window, or any opening to be selectively blocked by the fire door 10. Moreover, although a fire door 10 is shown and discussed, the present invention is equally applicable to any type of door, such as an open grated, security grill which closes a customer counter, a hurricane shutter for a window, a garage door, etc. Therefore, in the claims, the term "door" is intended to be broadly construed to include a broad range of structures which move in order to restrict or limit access or view through an opening, passageway, hole, or other similar location.

The fire door 10 is formed of a plurality of interconnected slats 13, which are guided for vertical travel by right and left guide rails 16, 18. When the fire door is in the open position, the slats 13 are rolled up onto a shaft and located inside a cover 20.

The purpose of the first and second ceiling fixtures 30, 38 and the first and second fire links 28, 36 is to sense a condition indicating a fire and to provide slack to the first chain 26 entering the mechanical drive box 24, upon the occurrence of a fire condition. For example, excessive heat, on the side of the door illustrated in FIG. 3, will melt the first fire link 28 and allow the first chain 26 to slack and partially pass into the mechanical drive box 24. Excessive smoke, on the side of the fire door 10 illustrated in FIG. 3, or a general fire alarm, will cause the first ceiling fixture 30 to release the second chain 32, thereby creating slack in the first chain 26 and allowing the first chain 26 to partially enter the mechanical drive box 24. The details of such fire condition sensors can be found in the background art, such as U.S. Pat. No. 4,147,197 or 6,484,784.

A first control panel 42 is mounted on a wall adjacent to the fire door 10. The first control panel 42 includes a first switch 44 for resetting/opening the fire door 10, a second switch 46 for testing/closing the fire door 10, and a first socket or electrical terminal 48 for receiving a second terminal 50 of a rechargeable battery 52. A second control panel 54, having a third switch 56, a fourth switch 58, and a third electrical terminal 60 is provided adjacent the fire door 10 on the other side of the wall, and has the same functions, respectively. To reduce costs, it would be possible to eliminate one of the first or second control panels 42, 54, while retaining many of the benefits of the present invention.

The door 10 opens and closes on guide rails 16, 18. Motor M in drive box 24 provides the power to move door 10 among various positions, from open to closed. A manual release handle 62 depends from a lower surface of the mechanical drive box 24. Pulling the manual release handle 62 will result in a testing/closing of the fire door 10. Optional visual indicators 64 are mounted on the walls adjacent to the fire door 10. The visual indicators 64 light up, or strobe, when the door is tested/closed. The visual indicators 64 may include indicia, such as "fire", "closing", "caution", etc. Also, optional audible indicators 66 are mounted on the walls adjacent to the fire door 10. The audible indicators 66 beep, alarm, or play a recorded announcement, when the door is tested/closed.

Figure 4:
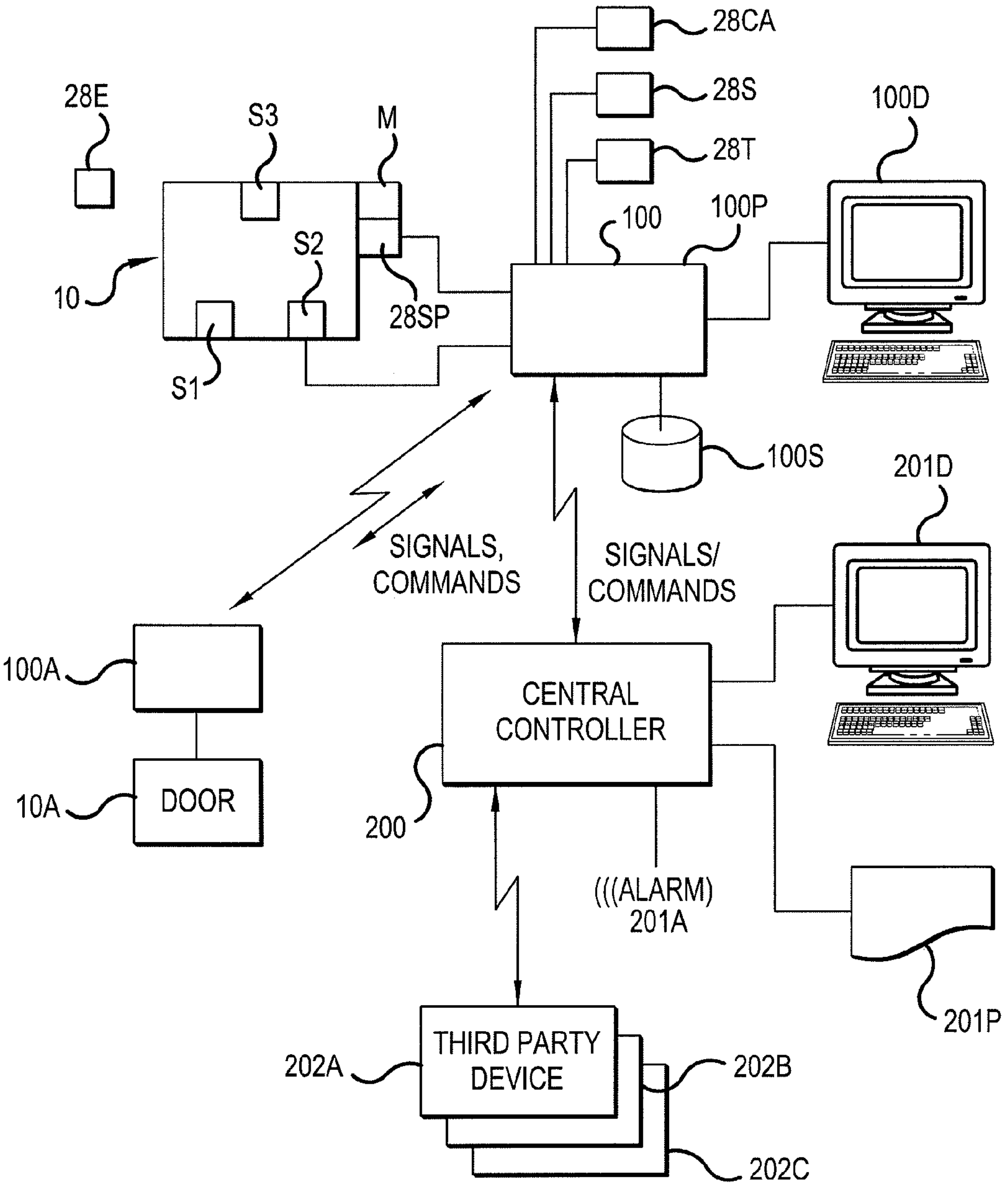
FIG. 4 is a schematic showing the programmable door controller of a representative fire door networked with another fire door and a central controller.

FIG. 4 is a schematic showing a programmable door controller of a representative fire door networked with another fire door and a central controller;

With reference to FIG. 4, the components of the active oxygen management, fire encirclement, and operational verification system of the present system will be described. A programmable door controller 100 is programmed to communicate with (either analog or digital) and recognize inputs from a plurality of sensors S1 to Sn which detect open, closed or other positions of the door 10, as well as from smoke detector 28S, heat detector 28T, camera 28CA, card reader 28CR, electronic eye 28E, motor ON/OF switch 28M, and broken spring detector 28SP. These sensors and detectors indicate various environment conditions, including door positions, the presence of smoke, temperature, condition of the firemen's key, battery condition, and source power availability, etc.

Once inputs are received, the programmable door controller 100 queries storage area 100S (containing relevant characteristics of the door and tables with sets of instructions for executing the oxygen management, testing, and monitoring function of the door controller), and then causes the processor 100P to execute the appropriate function.

Information gathered by and actions taken by the programmable door controller can be made available continuously throughout the network to all individual controllers (shown as door controller 100A associated with door 10A in FIG. 6) and to the central controller 200, through hard wired or wireless communication links. As can been seen in FIG. 4, the central controller 200 is connected to display unit 200D, audible alarm 200A, printer 200P, as well as to remote third parties 202A, 202B, 202C. Any activated or change in status of a sensor or detector which is gathered by door controller 100 can therefore be transmitted throughout the network. As mentioned above, a table programmed and stored in each door controller activates a response through the network based on pre-programmed responses to a change in status by one or more or the sensors and detectors.

FIG. 5 shows representative data tables stored in the database of each programmable door controllers. Table 300 shows a representative listing of all possible rings, e.g.: ring A, extended ring B, extended ring C, and extending ring D. Table 301 contains a set of instructions for implementing the rings. In this example, line 1 of table 301 shows the instruction set for implementing ring A and monitoring the result. Line 2 of table 301 shows the instruction set for implementing ring B in the event that ring A is not completed successfully. Line 3 of table 301 shows the instruction set for implementing ring C in the event that rings A and B are not completed successfully.

Other data stored in the database of each of the programmable door controllers include the characteristics of the associated door and sensors, and the status of the other doors in the network. Other information stored includes instruction sets for communicating, commands for initiating fire door testing, and instructions for generating reports, etc.

Figure 6:
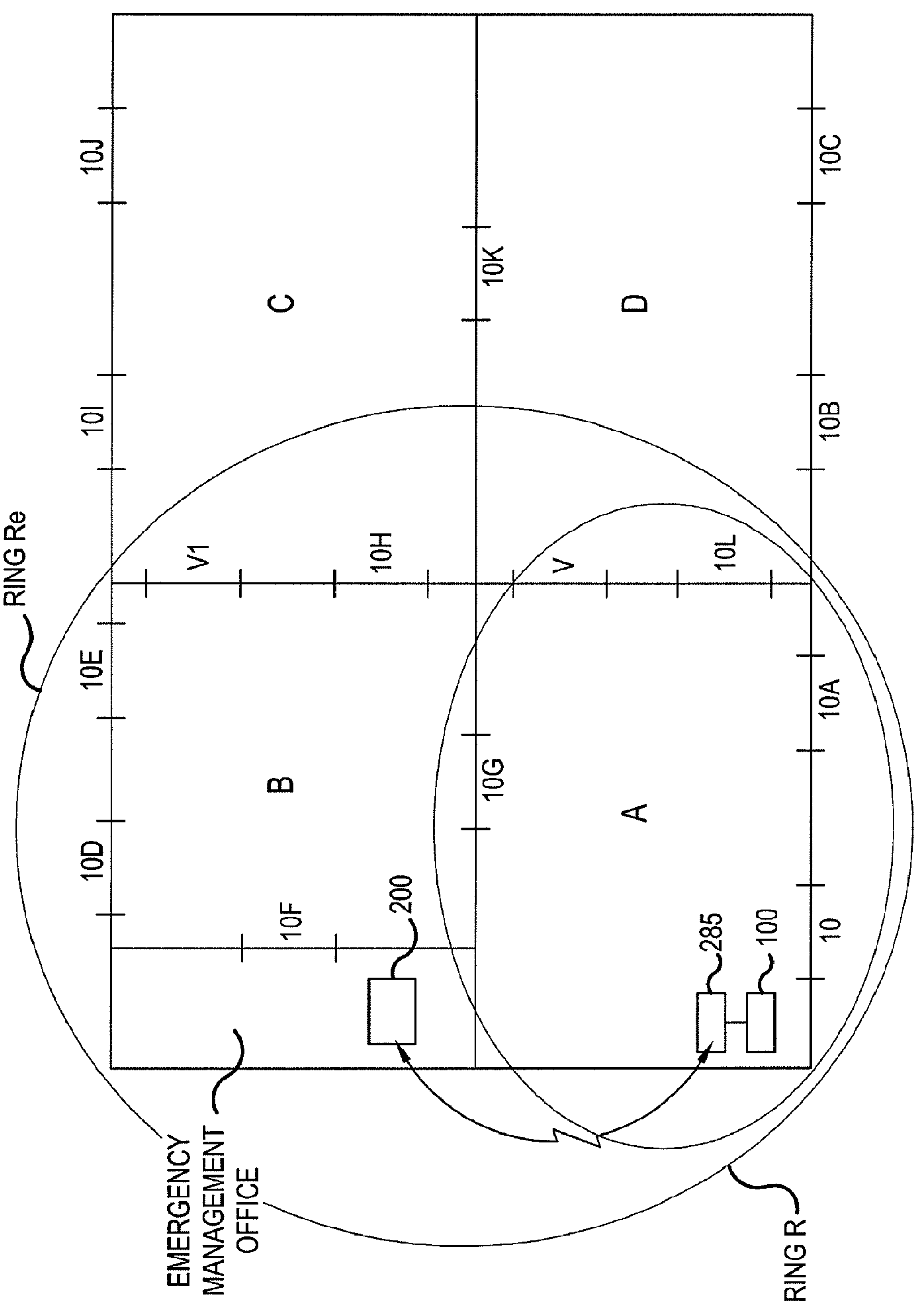
FIG. 6 is a diagram showing the closure of selected fire doors to provide one or more "rings" around a fire in one area of the building.

An example of how the system operates is shown in FIG. 6. FIG. 6 shows the building of FIG. 1, annotated to show the closure of selected fire doors to provide a "ring" around a fire in area A of the building. As can be seen, smoke detected by smoke detector 28S in area A sends a signal to door controller 100 and activates smoke alarm 64. Immediately the door controller 100 searches its data base 100S to determine what actions should be taken, and then executes instructions to cause doors 10, 10A, 10L, 10H, and vent V to close. If each of doors 10, 10A, 10L, 10H, and vent V close successfully, a ring R is formed around space A in which smoke has been detected, thus containing the smoke laden air, and restricting oxygen to a fire within area A.

However, if one or more of doors 10, 10A, 10L, 10H do not close successfully as programmed, ring R which was intended to be formed around space A, may not be complete. For example, if programmable door controller 100 receives a signal from the door controller associated with door 10G that it has failed to close as intended, door controller 100 is alerted in order that other action can be taken. Programmable door controller 100 may, for example, on the basis of pre-programmed instructions, send commands to from the door controllers associated with doors 10D, 10E, 10F, and 10H and vent V1, instructing them to close, thus forming an extended ring Re around areas A and B.

In addition, a flash message may be sent by door controller 100 throughout the system that vent V failed to close. Further, this message could be transmitted to the building emergency management office, operations center, or off site to be relayed to arriving firemen giving floor and location direction.

Method of Controlling Oxygen by Closing Selected Doors

Figure 7:
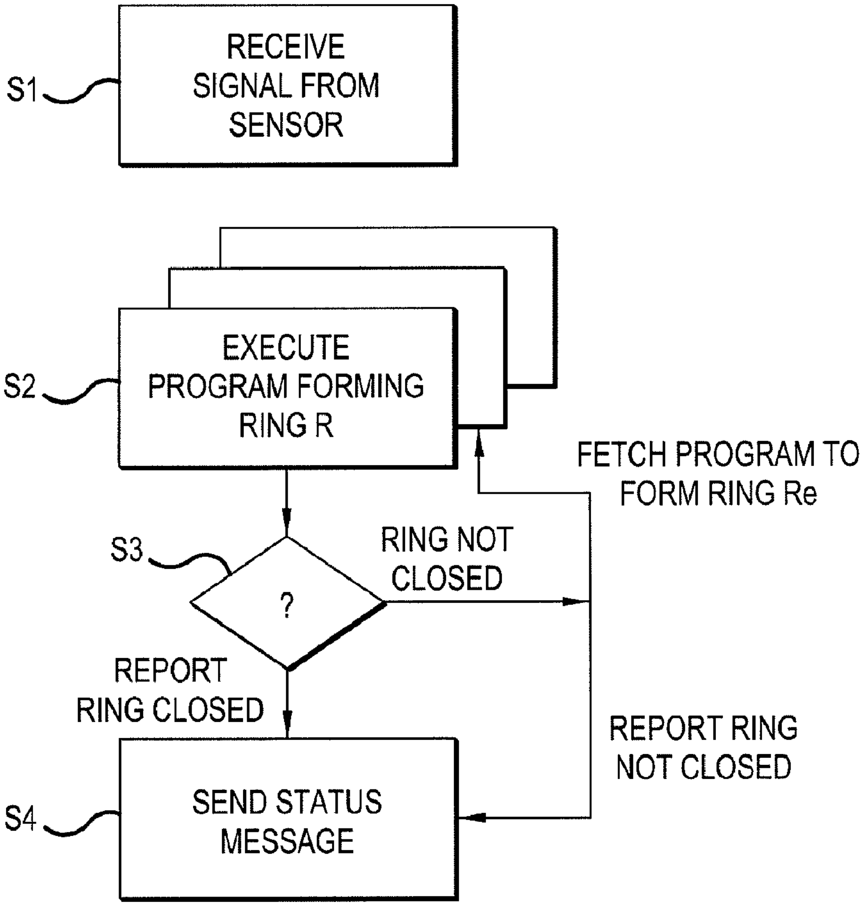
FIG. 7 is a flow chart indicating the steps taken by the system of the present invention to control oxygen by closing doors shown in FIG. 6.

FIG. 7 is a flow chart indicating the steps taken by the system of the present invention to control oxygen by closing selected doors shown in FIG. 6.

As can be seen Step S1 indicates the receipt of a signal from a detector indicating an abnormal condition. In Step S2, the controlled executes a program responding to the abnormal signal. For example, if detector 28S senses smoke in area A, the door controller executes a program to form a ring R around area A. In Step S3 it is determined whether or not if each of doors 10, 10A, 10L, 10H, and vent V close successfully, a ring R is formed around space A in which smoke has been detected, thus containing the smoke laden air, and restricting oxygen to a fire within area A. If all of doors 10, 10A, 10L, 10H close successfully, and ring R has indeed been formed, a message (Step S4) is sent to the console 100D of door controller 100 and to the central controller 200 to notify interested personnel.

However, if one or more of doors 10, 10A, 10L, 10H do not close successfully as programmed, ring R intended to be formed around space A, may not be complete. In this case, the programmable door controller 100 receives a signal from door 10H that it has failed to close as intended, alerting door controller 100 in order that other action can be taken by repeating Step S2.

In this case, programmable door controller 100 may, for example by repeating Step S2 on the basis of a second set of pre-programmed instructions, send commands to doors 10D, 10E, 10F, and 10G and vent V1, instructing them to close, thus forming an extended ring Re around areas A and B. Step S3 once again determines whether or not the action (Step S2 repeated) to form extended ring Re has been successful. Regardless of the outcome of the repeated Step S2, another message (Step S4) is sent to the console of door controller 100 and to the central controller 101 to notify interested personnel of this latest status. In addition, in the formation of Ring Re is not successful the system loops back to Step S2 and Step S3 another time, until sufficient doors, vents and other openings are closed and a ring is successfully implemented and the fire can be starved of oxygen.

Further, these messages can be transmitted to other emergency management personnel, to another operations center, or to an off-site location to be relayed to arriving firemen giving floor and door location directions.

Testing and Reporting the Condition of the Networked Doors

Additionally, the system can self monitor tests, generate reports and manage maintenance of any door in the system. For instance, the processor 100P of door controller 100 contains a clock and calendar. A designated input on the console of the door controller 100 can cause door to execute a test routine. Along will all relevant characteristics of door 10, the height of door 10 is pre-programmed into the door controller processor at the time of initial programming, enabling door controller 100 to automatically execute an open, delay, and close sequence constituting a drop test of the door. An algorithm in door controller 100 determines the actual drop speed of door 10 based on the door height (set at installation) and the time taken to close from the top limit. This speed in inches/sec. is displayed on a display screen 100D of the door controller 100, along with a “PASS” or “FAILED” message which is stored along with the date of test. If a door spring were broken, for example, door 10 might crash down at a rate much faster than desired. If an obstruction or a door malfunction prevents door 10 from completely closing, a full test cannot be completed.

The results of the test are transmitted through the network along with data from other units to interested parties such as insurance carriers and maintenance engineers. Operator input on a console of the door controller 100, for instance, could cause door controller 100 to initiate a scrolling sequence of messages to be displayed on the local display screen 100D, such as date of last test, pass/fail, drop speed, battery condition, date of last battery test, set up parameters, etc. In his way, interested parties such as fire inspectors, insurance inspectors, building managers and maintenance engineers can monitor door condition and operational status.

Figure 8:
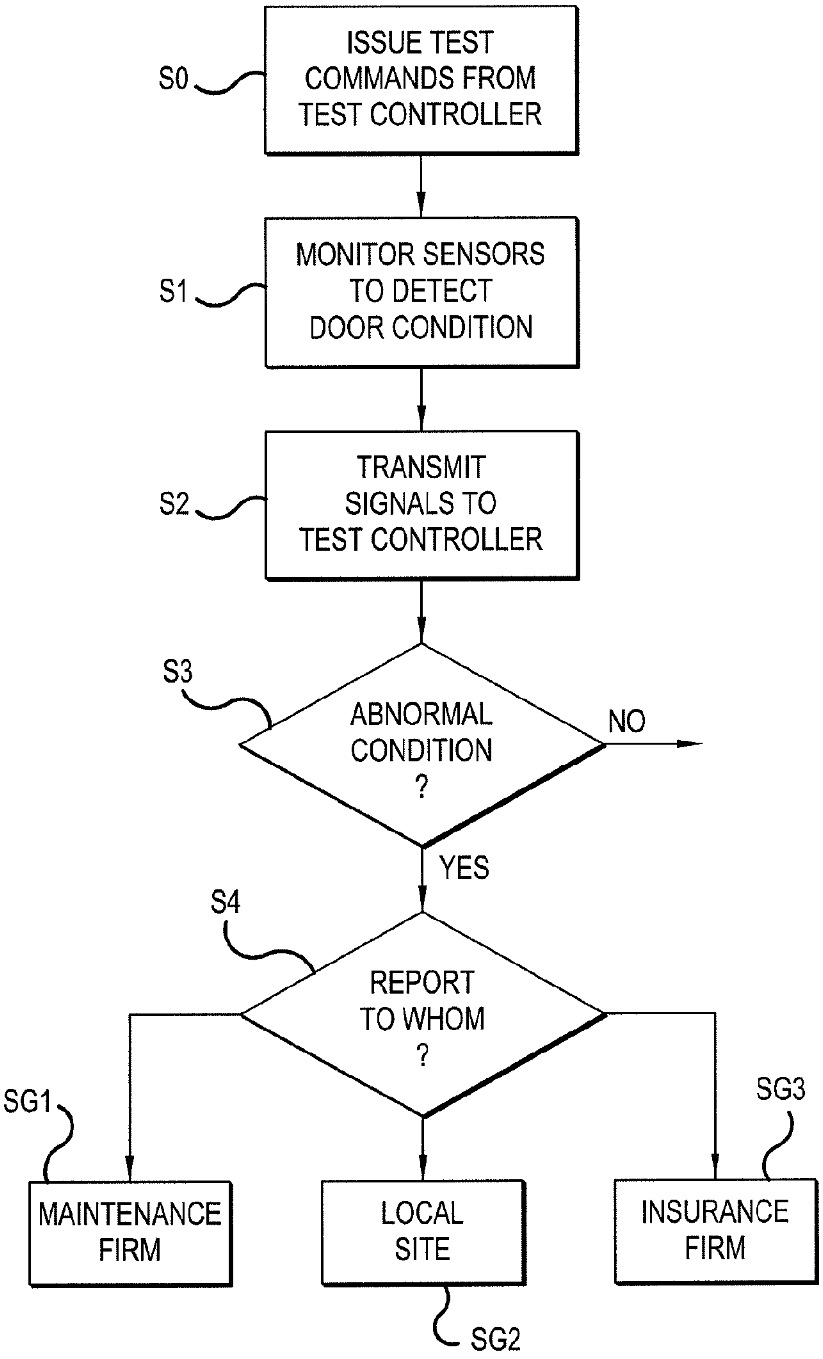
FIG. 8 is a flow chart showing the method of issuing test commands and providing centralized reports of conditions of the networked doors of the present invention.

The testing and reporting method of the networked door system will be described with reference to FIG. 8. In this situation, testing is initiated from the central site, and no person need be available at the site where the door 10 is installed. Alternatively, the testing may be initiated through any one of the door controllers in the network. In other words, a specific door controller may also act as a central controller.

In Step S0, a command is issued by the central controller 200 to the door 10 to move the door 10 from the first position to the second position.

In Step S1, sensors S1-Sn and detectors 28S, 28T, 28CA, 28CR, 28E, 28SP monitor for a first position and a second position and any abnormality condition in an operating environment of a remote door 10. In Step S2, signals from the sensing means S1-Sn and detector means 28S, 28T are transmitted via the door controller 100 to a central controller 200. The signals indicate at least the first position, the second position, and/or and the abnormality condition in the operating environment of the door 10.

In Step S3, the first position, the second position, and/or the abnormality condition of the door 10 are reported on one or more of output units 201D, 201P, 201A connected to the central controller 200 (see FIG. 4). The reporting of this data notifies an operator at the central location of at least the first position or the second position, and/or the abnormality condition of the door 10. Summary reports may also be reported out.

In Step S4, a decision is made whether or not to forward the transaction data of summary reports on the door 10 to any of several other devices in other locations or organizations, for example, a maintenance company, an insurance firm, or back to the warehouse where the door 10 is installed. If yes, the method proceeds to Step 5; if no the method ends.

If yes to Step S5, the method branches to one of Steps 6A, 6B, or 6C, where the central controller 200 creates and sends data and/or summary reporting information on the door 10 to the appropriate party.

Alternatively, testing of the door 10 may be initiated by a person where the door 10 is installed. In this situation, as described below, while the testing of the door 10 is initiated where the door 10 installed, the sensors and detectors still capture and send signals to the central controller 200 for reporting.

The operator inserts the electrical terminal 50 of the rechargeable battery 52 into the first or second electrical terminal 48 or 60 of the first or second control panel 42 or 54. Next, the operator presses the second switch 46 or 58. Typically, the second switch 46 or 58 would be labeled "test/close", or some other similar wording. It is also possible to test/close the fire door 10 even if the operator does not have a rechargeable battery 52 in his possession. The operator can simply pull and hold the release handle 62, as discussed above.

Regardless of where testing is initiated, so long as the fire door 10 has not yet reached its closed position, sensor S2 is not activated. If the door 10 fails to completely close, one of sensors S3-Sn emits a signal indicating an abnormality.

Auto and Remote Reset (Reboot) of a Malfunctioning Subsystem of a Door

The system of the present invention provides a more efficient and far less costly operation than with conventional systems. The door controller 100 of the present invention either self-reboots due to an expired time limit on an input from a subsystem, or calls the central controller 200 to have the central monitoring personal remotely review the current status of all subsystems, determine the cause of the malfunction, and then issue a command to either remotely override the subsystem, or to cause the power supply to the offending subsystem to be interrupted, thereby initiating a "remote reboot".

Remote Override of a Malfunctioning Subsystem of a Door

Unlike, conventional systems, the door controller 100 of the present invention monitors the time of each input for fault, sends a fault message to the central location, allowing the central site operator to view system status and override the malfunctioning subsystem (for example, motor ON/OF switch 28M, broken spring detector 28SP) and allow the door 10 to close. A time limit, of say 24 hours, on the override would be attached to the override command to ensure that the offending subsystem would be repaired and not left permanently overridden. Since the current status of all subsystem actuators are monitored by the remote controller (local to the door) and viewable through the system, the operator at the central location can ascertain that other safety systems are in fact not also active and therefore a true fault exists. A further refinement is a camera at the door location that can send a picture of the opening through the system to the central location. The operator at the central site can then "see" whether or not anyone is present, and whether it is safe to override offending subsystem. The present system is configured to comply with the different rules and requirements set forth by Underwriter Laboratories (UL) for safety controls of doors and gates that are "viewed" by an operator at a different site.

Broken Spring Detection and Maintenance Monitoring

One of the sensors of the present invention is a sensor 28SP for sensing broken door springs. Inputs from sensor 28SP permit monitoring of the opening run time from full closed position and the closing run time from full open position. In normal conditions, these times will be more or less equal and a program in either the door controller 100 or the central controller 200 could keep a running average, not unlike a running fuel economy average on modern automobiles. However, with broken springs, a differential in run times will appear. These new run times can also be averaged so that one incident maybe caused by a momentary wind load does not also trigger the broken spring alarm. For example, an average of 2 or 4 cycles could be observed. However, when the program determines that a differential meets the predetermined criteria, the unit will switch to "broken spring mode" and send alarm through system to central controller 200. "Broken spring mode" might trigger an alarm light on the remote control unit 100 and/or the central controller 200, send a broken spring message, generate an open command to hold the door open, close and hold the door closed, or permit the door to be operated by remote operator only, for example, depending on the particular needs of the user's organization and the particular configuration of the system.

Modifications

The present invention can be modified in many different ways, after understanding the broad teaching of the disclosure. For example, the fire door illustrated in the FIGS. is an overhead type door, having interconnected slats, which are rolled up when stored. In the illustrated fire door, gravity provides the force tending to draw the fire door closed across the throughway.

It would be possible to have a solid fire door, or even a fire door with interconnected slats, which are not rolled up when stored (such as a common garage door which has slats, which are not rolled up when the garage door is stored overhead). Further, the fire door could be stored in its open position beneath a floor or countertop. Alternatively, the fire door 10 could be stored in its open position in or beside a wall, lateral of the throughway to be closed. Such doors are known in the background art, and typically utilized a counterbalance weight or spring system to create the force tending to draw the fire door closed across the throughway.

Further, the sensors may by any of a variety of sensors, and if a system has no remote controller, the sensors may directly communicate with the central control unit over a communications channel.

Still further, the door controller and the central control unit may be programmed to display or forward a variety of standard or customized reports or data about the positions and/or abnormality conditions of the door. Further, exception reporting is to be considered to be within the scope of this invention.

Still further, while FIG. 6 illustrates interior spaces having several doors as members of the encirclements rings R and Re, an interior space may have only one door that needs to be closed to encircle and contain an abnormal condition. Examples of interior spaces with only one door are the emergency management office shown in FIG. 6, or a vault.

The door controllers may be programmed to issue commands to the remotely located fire doors, either automatically, or by command of an operator.

The communications links between the components of the system may be hard wired or wireless links.

Still further many other operating and testing modes can arise from "sensors" in the network, for example: a code red mode with a run characteristic that closes the door and only allows the guard input to operate the door ignoring all other inputs. This would be useful in keeping biological, radiological, or dust cloud from entering the building. Other modes could include a valet mode, a fire mode, a day and night mode, a security level 1, 2, 3 mode.

In the present invention, the term "door" may refer to an interior door or an exterior door. As discussed above, it will be noted that the invention may be varied in many ways. Such variations are not to be regarded as a departure from the spirit and scope of the invention, and all such modifications as would be obvious to one skilled in the art, are intended to be included within the scope of the following claims.

What is claimed is:

1. A fire control and testing system for networked doors, comprising:

a building equipped with at least a first and second door enclosing one or more interior spaces, and separating the one or more interior spaces from other interior spaces;

a first programmable door controller and at least a first sensor for monitoring a predetermined condition associated with the first door, a second programmable door controller and at least a second sensor for monitoring a predetermined condition associated with the second door, each one of the first and second programmable door controllers for receiving inputs from the at least one sensor from the associated door, the first and second programmable door controllers being interconnected with each other, and containing instructions for communicating messages and commands to each other if either of the predetermined conditions is determined to be an abnormal condition, wherein if the abnormal condition is sensed by the at least one sensor associated with the first door, the first programmable door controller associated with the first door executes a first predetermined set of instructions causing a command to be communicated to the second programmable door controller associated with the second door, which causes the second programmable door controller associated with the second door to execute a predetermined instruction set effecting the second door, wherein when the predetermined condition is determined to be the abnormal condition, the fire control and testing system controls the abnormal condition.

2. The fire control and testing system for networked doors according to claim 1, wherein each of the first and second programmable door controllers is programmed to store instructions defining a specific one or ones of the doors which form at least one closed ring around the one or more interior spaces.

3. The fire control and testing system for networked doors according to claim 1, wherein the closing of the at least the first and second doors creates a closed ring around the one or more of the interior spaces, encircles a fire and restricts oxygen therefrom.

4. The fire control and testing system for networked doors according to claim 1, wherein the first and second programmable door controllers exchange status information with each other about the status of each of the doors.

5. The fire control and testing system for networked doors according to claim 1, wherein the abnormal condition is a smoke concentration above a predetermined level or a temperature above a predetermined level that is detected by the at least one sensor.

6. The fire control and testing system for networked doors according to claim 1, wherein the first programmable door controller associated with the first door executes the first predetermined instruction set to cause the second door to close.

7. The fire control and testing system for networked doors according to claim 6, wherein the first programmable door controller associated with the first door executes a second predetermined instruction set when the second door does not close.

8. The fire control and testing system for networked doors according to claim 6, if the second door does not close, the first programmable door controller associated with the first door executes a second predetermined instruction set which sends a command to a third programmable door controller.

9. The fire control and testing system for networked doors according to claim 1, further comprising a central controller communicating with each of the first and second programmable door controllers.

10. The fire control and testing system for networked doors according to claim 9, wherein if an abnormal condition is sensed by the at least one sensor associated with the first door, the first programmable door controller associated with the first door executes a predetermined set of instructions causing a command to be communicated to the central controller.

11. The fire control and testing system for networked doors according to claim 1, wherein the abnormal condition is an abnormal door position.

12. The fire control and testing system for networked doors according to claim 1, wherein each of the at least the first and second doors is a member of one or more containment rings for encircling an abnormal condition, and wherein an output device associated with each of the programmable door controllers displays whether or not the door is a member of the one or more of the rings when the abnormal condition occurs.

13. The fire control and testing system for networked doors according to claim 1, wherein each of the at least the first and second doors is a member of one or more containment rings for encircling an abnormal condition, and wherein an output device associated with each of the programmable door controllers or a central controller displays a listing of the doors in each of the rings and a listing of any others of the doors that are not the members of any of the rings.

14. A method of providing oxygen management, fire encirclement, and fire door testing, comprising the steps of:

providing a plurality of programmable door controllers, each having at least one sensor for detecting predetermined conditions of an associated one of a plurality of doors in a building, the programmable door controllers being interconnected on a network enabling each of the programmable door controllers to communicate with one another;

receiving a signal from a specific one of the programmable door controllers from the at least one sensor indicating an abnormal condition with the associated one of the plurality of doors;

executing an instruction set in the specific one of the programmable door controllers to issue commands to other specific ones of the programmable door controllers, the associated doors of which form a closed ring, the commands instructing the doors forming a closed ring to close;

determining whether or not the closed ring has been successfully formed, and if the closed ring has not been successfully formed, executing another instruction set to different specific ones of the programmable door controllers, the associated doors of which form an extended closed ring, thereby managing an amount of oxygen in the closed ring or extended closed ring.

15. A method of providing oxygen management, fire encirclement, and fire door testing, comprising the steps of:

providing a plurality of programmable door controllers and at least one sensor for each of two or more doors in a building, the sensors for detecting predetermined conditions of the doors, each of the programmable door controllers being interconnected on a network enabling the programmable door controllers to communicate with one another;

receiving a signal at a specific one of the programmable door controllers from the at least one sensor indicating an abnormal condition with one of the two or more associated doors;

executing an instruction set in the specific one of the programmable door controllers to issue commands to other specific ones of the programmable door controllers, the associated doors of which form a closed ring, the commands instructing the doors forming a closed ring to close;

determining whether or not the closed ring has been successfully formed; and if the closed ring has not been successfully formed, executing another instruction set to different specific ones of the programmable door controllers, the associated doors of which form and extended closed ring and sending a message indicating whether or not a closed O2 management ring has been formed and displaying that message to warn firefighters whether or not a particular door that is a part of O2 management ring has in fact been closed or is part of the closed ring.

16. A fire control and testing system for networked doors, comprising:

a building equipped with two or more networked doors enclosing interior spaces, and separating the interior spaces from each other;

a plurality of programmable door controllers and at least one sensor associated with each of the doors, each of the programmable door controllers for issuing operations instructions and/or test commands for testing a closing an associated door, and the at least one sensor monitoring a predetermined condition associated with the associated door, each one of the programmable door controllers for receiving an input from at least one sensor from the associated door, and containing instructions for communicating messages to at least one output device if the predetermined condition is determined to be an abnormal condition, wherein if the abnormal condition is sensed by a program of a specific one of the programmable door controllers, the specific programmable door controller will display a predetermined message associated with the abnormal condition on the at least one output device, and the specific programmable door controller associated with a first one of the doors executes a predetermined set of instructions causing a command to be communicated to another programmable door controller associated with a second one of the doors, which causes the another programmable door controller associated with the second door to execute a predetermined instruction set effecting the second door.

17. The fire control and testing system for networked and non-networked doors according to claim 16, wherein the abnormal condition is a failure event whereby one of the doors fails to close within a predetermined time period after issuing of the operations instructions and/or the test commands for closing the door.

18. The fire control and testing system for networked and non-networked doors according to claim 16, wherein after the operations instructions and/or the test commands have been executed, the specific programmable door controller calculates and remembers the time and date of a pass event or the failure event for reporting on the output device, thereby notifying an operator or an interested party the date and result of the testing.

19. The fire control and testing system for networked and non-networked doors according to claim 16, wherein the abnormal condition is a change in an opening or a closing speed that exceeds a predetermined value.

20. The fire control and testing system for networked and non-networked doors according to claim 19, wherein after the operations instructions and/or the test commands have been executed, the specific programmable door controller calculates and remembers the opening speed and the closing speed for reporting on the output device, thereby notifying an operator or interested party of the opening and the closing speed.

21. The fire control and testing system for networked and non-networked doors according to claim 19, wherein after the operations instructions and/or the test commands have been executed, the specific programmable door controller calculates and remembers the opening speed and the closing speed for reporting on the output device, thereby notifying an operator or interested party as to the opening and the closing speed and indicating the abnormal condition if a change in the opening or the closing speed is determined to exceed a predetermined value.

22. The fire control and testing system for networked and non-networked doors according to claim 16, wherein the abnormal condition determined by exceeding a predetermined value is a broken spring on a rolling door, or broken closure on a swing door, or another failure condition.

23. The fire control and testing system for networked and non-networked doors according to claim 22, wherein after the operations instructions and/or the test commands have been executed, the specific programmable door controller calculates and remembers the opening speed and closing speed for reporting on the output device, thereby notifying an operator or interested party as to the opening and closing speed indicating an abnormal condition if a change in the opening or the closing speed is determined to exceed a predetermined value and the abnormal condition is the broken spring on the rolling door, the broken closure on the swing door, or the another failure condition.

24. The fire control and testing system for networked and non-networked doors according to claim 22, wherein when the broken spring abnormal condition exists, the system initiates an alteration in a run characteristic of the rolling door and issues another set of instructions preprogrammed in the associated programmable door controller.

* * * * *